Patented Jan. 11, 1927.

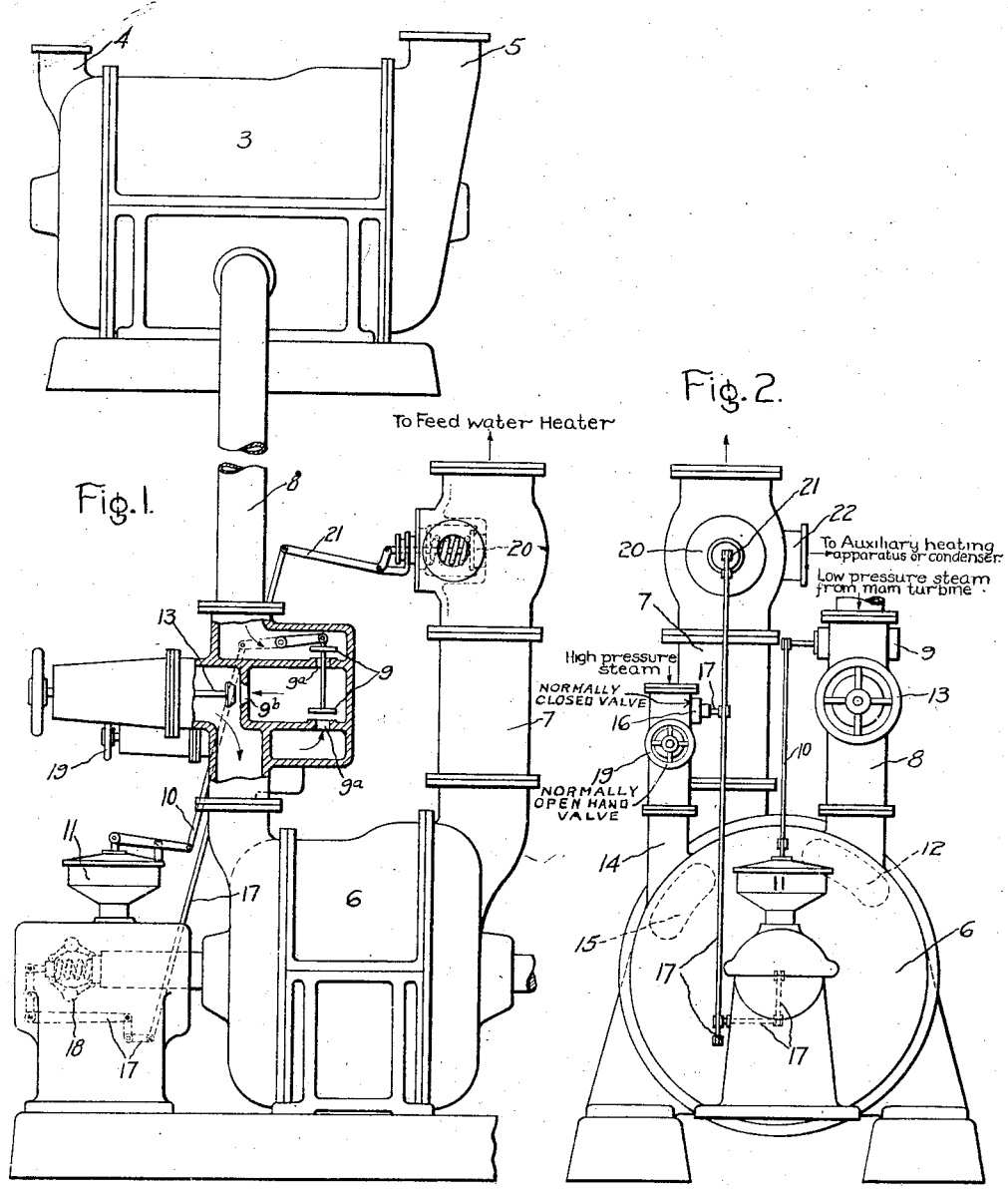

1,614,128

UNITED STATES PATENT OFFICE.

PAUL HÖSEL AND GUSTAV PAGEL, OF CHARLOTTENBURG, GERMANY, ASSIGNORS, BY MESNE ASSIGNMENTS, TO GENERAL ELECTRIC COMPANY, OF SCHENECTADY, NEW YORK, A CORPORATION OF NEW YORK.

ELASTIC-FLUID-TURBINE INSTALLATION.

Application filed January 24, 1925, Serial No. 4,561, and in Germany March 21, 1924.

The present invention relates to elastic fluid turbine installations wherein there is provided a condensing main turbine and in connection with it a non-condensing auxiliary turbine which is used to drive an auxiliary or auxiliaries for the main turbine, the exhaust from the auxiliary turbine being utilized in a feed water preheater for heating the condensate from the condenser of the main turbine. It relates especially to installations wherein the non-condensing auxiliary turbine is used to drive a pump or pumps, such as the pumps for the cooling water for the condenser of the main turbine and for the condensate of the condenser. As is well known, the condensate of the main turbine is used usually as feed water for the boilers.

The object of the invention is to provide an improved arrangement for operating and regulating an auxiliary turbine when used in this way, whereby at all loads on the main turbine good economy in the use of heat will result, and for a consideration of what we believe to be novel and our invention attention is directed to the accompanying description and the claims appended thereto.

In the drawing, Fig. 1 is a diagrammatic view in side elevation of an installation embodying our invention, and Fig. 2 is an end view thereof.

Referring to the drawing, 3 indicates diagrammatically a condensing main turbine, 4 being its admission conduit and 5 its discharge conduit. The admission conduit receives operating elastic fluid from any suitable source through suitable regulating valve means, and exhausts through conduit 5 to the condenser. The regulating valve mechanism, the condenser and other special parts of turbine 3 are not illustrated in the drawing as they form no part of the present invention. The turbine 3 is to be taken as typical of any suitable turbine. At 6 is indicated a non-condensing auxiliary turbine which drives auxiliaries for the main turbine and which has an exhaust conduit 7 which conveys the exhaust from turbine 6 to a feed water heater.

As is known, the amount of cooling water required in the condenser for the main turbine and the amount of condensate to be pumped varies directly with the load on the main turbine, and, at the same time, the amount of feed water to be heated, and hence the amount of heating steam required for this purpose varies also directly with the load on the main turbine. In addition to this, it is known also that the pressure throughout the stages in a multi-stage turbine varies directly with the load on the turbine. A consideration of the foregoing shows that when an auxiliary turbine is provided for driving auxiliaries, such as pumps, for the main turbine, and for feed water heating, the load on the auxiliary turbine and the feed water heating equipments vary directly with the load on and hence the pressure in the main turbine.

According to the present invention advantage is taken of the foregoing fact and to this end the admission conduit 8 for the auxiliary turbine 6 is connected directly to an intermediate stage of the main turbine 3 wherein exists a pressure suitable for operating auxiliary turbine 6, and no speed regulator is provided for the auxiliary turbine, the pressure of the elastic fluid supplied to the auxiliary turbine being left free to vary directly with the stage pressure, which means that it varies directly with the load on the main turbine. With this arrangement the power input to the auxiliary turbine varies directly with the load on the main turbine and since at the same time the power requirements for the auxiliary turbine and the requirements for exhaust elastic fluid for feed water heating also varies directly with the load on the main turbine the result is obtained that the auxiliary turbine will be automatically regulated in an efficient manner to perform the duties required of it. In other words, as the load on the main turbine varies, thereby varying the load requirements of the auxiliary turbine and the feed water heating requirements, the amount of elastic fluid supplied to the auxiliary turbine is likewise automatically varied by reason of the variations in the stage pressure of the main turbine. This means that the auxiliary turbine will be economically regulated in accordance with its actual load requirements and the requirements of the installation. As a result the economy of the installation as a whole is improved.

In connection with the foregoing arrangement I provide in conduit 8 a suitable regulating valve 9 connected by a leverage system 10 to a speed governor 11. This speed governor is somewhat of the nature of an over speed emergency governor, the same being set so that under normal operating conditions it is inactive, regulating valve 9 being held open. In case a predetermined high speed is exceeded, however, it comes into action to close valve 9 more or less. In other words, when a predetermined speed is exceeded, governor 11 takes control of the auxiliary turbine temporarily until normal operating conditions are restored. Conduit 8 is shown as conducting elastic fluid to a group of nozzles 12 and as being provided with a suitable hand operated shutoff valve 13 by means of which the flow of elastic fluid to the auxiliary turbine may be manually regulated or entirely shut off. The electric fluid from turbine 3 in passing through valve 9 flows through ports 9ª to the interior of the valve casing from whence it flows through port 9ᵇ to turbine 6.

It is desirable that at no time should the speed of turbine 6 fall below a certain minimum value for it is important that the auxiliaries such as the pumps, remain always in effective operation. To guard against this possibility, there is provided in connection with turbine 6 an admission conduit 14 which leads from a suitable source of high pressure elastic fluid and supplies elastic fluid to a group of turbine nozzles 15. In conduit 14 is a regulating valve 16, similar to valve 9 connected by a leverage system 17 to a speed governor 18 on the auxiliary turbine. Speed governor 18 is set so that at normal operating speeds it maintains valve 16 closed. In case the speed of the auxiliary turbine falls below a predetermined value it opens valve 16 to admit high pressure elastic fluid to turbine 6. In conduit 14 is a manually operated valve 19 similar to valve 13 by means of which the flow of elastic fluid through conduit 14 may be regulated or entirely shut off.

With the above-described arrangement it will be seen that there is provided an arrangement wherein the auxiliary turbine is normally and over a certain operating speed range controlled entirely by the variations in pressure which occur in the main turbine with changes in load on the main turbine but that in case of either an increase in speed above a predetermined value or a decrease in speed below a predetermined value, a speed governor takes control to maintain certain maximum and minimum operating conditions.

When speed governor 18 operates to open valve 16 to admit elastic fluid to the auxiliary turbine 6, the condition may exist that the exhaust from turbine 6 will be in excess of that required for feed water heating purposes. To avoid this there is provided in exhaust conduit 7 a blow-off valve 20 which is connected to speed governor 18 through the intermediary of a lever 21 and leverage system 17, the arrangement being such that speed governor 18 in addition to opening valve 16 opens also blow-off valve 20 thereby permitting exhaust elastic fluid to escape from exhaust conduit 7 through a conduit 22 which may convey it to other heating apparatus, to a condenser or other region.

The speed governors 11 and 18 and also the valve mechanisms are shown diagrammatically and by way of example. It will be understood that any suitable types of governors and valve mechanisms arranged in any suitable manner may be utilized in the practical carrying out of our invention.

In accordance with the provisions of the Patent Statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:—

1. In a power installation, the combination of a condensing main turbine, a non-condensing auxiliary turbine, a conduit connecting the admission end of the auxiliary turbine to an intermediate point of the main turbine, a normally open regulating valve in said conduit, and a speed governor for said valve which is responsive to the speed of the auxiliary turbine and which is set so that during normal operation it holds said valve open and comes into action to close the valve only when the speed of the auxiliary turbine exceeds a predetermined high value.

2. In a power installation, the combination of a condensing main turbine, a non-condensing auxiliary turbine, a conduit connecting the admission end of the auxiliary turbine to an intermediate point of the main turbine, a normally open regulating valve in said conduit, a speed governor for said valve which is responsive to the speed of the auxiliary turbine and which is set so that during normal operation it holds said valve open and comes into action to close the valve only when the speed of the auxiliary turbine exceeds a predetermined high value, and means for supplying elastic fluid from another source directly to said auxiliary turbine when the speed falls below a predetermined low value.

3. In a power installation, the combination of a condensing main turbine, a non-condensing auxiliary turbine, a conduit connecting the admission end of the auxiliary turbine to an intermediate point of the main turbine, a normally open regulating valve in said conduit, a speed governor for said valve which is set so that during normal operation it holds said valve open and comes into action to close the valve only when a predetermined high speed is reached, means for supplying elastic fluid from another source to said auxiliary turbine when the speed falls below a predetermined low value, an exhaust conduit for the auxiliary turbine which conveys exhaust elastic fluid to a heating apparatus, a blow-off valve in the exhaust conduit of the auxiliary turbine, and mechanism for actuating it when elastic fluid is supplied to said auxiliary turbine by said means.

4. In a power installation, the combination of a condensing main turbine, a non-condensing auxiliary turbine, a conduit connecting the admission end of the auxiliary turbine to an intermediate point of the main turbine, a normally open regulating valve in said conduit, a second admission conduit for the auxiliary turbine, a normally closed regulating valve therein, an exhaust conduit for the auxiliary turbine which conveys exhaust elastic fluid to the heating apparatus, a blow-off valve in the exhaust conduit of the auxiliary turbine, and an overspeed governor and an underspeed governor for the auxiliary turbine, said overspeed governor being connected to said normally open regulating valve and said underspeed governor being connected to said normally closed regulating valve and to said blow-off valve.

In witness whereof, we have hereunto set our hands this 5th day of January, 1925.

PAUL HÖSEL.
GUSTAV PAGEL.